United States Patent
Handschick

(10) Patent No.: US 8,813,938 B2
(45) Date of Patent: Aug. 26, 2014

(54) DEVICE FOR TAKING BACK EMPTY CONTAINERS, IN PARTICULAR PLASTIC BOTTLES AND METAL CANS

(71) Applicant: Envipco Holding N.V., Amersfoort (NL)

(72) Inventor: Bert Handschick, Oldersdorf (DE)

(73) Assignee: Envipco Holding N.V., Amersfoort (NL)

( * ) Notice: Subject to any disclaimer, the term of this patent is extended or adjusted under 35 U.S.C. 154(b) by 0 days.

(21) Appl. No.: 13/865,757

(22) Filed: Apr. 18, 2013

(65) Prior Publication Data

US 2013/0299304 A1 Nov. 14, 2013

Related U.S. Application Data

(63) Continuation of application No. PCT/DE2011/001857, filed on Oct. 18, 2011.

(30) Foreign Application Priority Data

Oct. 18, 2010 (DE) .................. 10 2010 048 840

(51) Int. Cl.
  *B65G 11/00* (2006.01)
  *G07F 7/06* (2006.01)
  *B65G 11/02* (2006.01)

(52) U.S. Cl.
  CPC ............ *B65G 11/023* (2013.01); *G07F 7/0609* (2013.01)
  USPC ....... 193/2 R; 193/25 A; 193/25 FT; 198/540

(58) Field of Classification Search
  USPC ..... 193/2 R, 3, 25 A, 25 FT, 44, 47; 198/562, 198/540
  See application file for complete search history.

(56) References Cited

U.S. PATENT DOCUMENTS 1,408,497 A * 3/1922 Bragdon .................. 193/47
4,411,351 A   10/1983 Lowder et al.
(Continued)

FOREIGN PATENT DOCUMENTS

DE          295 03 823    7/1995
DE    20 2007 000 846    4/2007
(Continued)

OTHER PUBLICATIONS

PCT Notification Concerning Transmittal of International Preliminary Report on Patentability for PCT/DE2011/001857, dated May 2, 2013 (7 pgs.).

(Continued)

*Primary Examiner* — Leslie A Nicholson, III
*Assistant Examiner* — Keith R Campbell
(74) *Attorney, Agent, or Firm* — Shlesinger Arkwright & Garvey, LLP

(57) ABSTRACT

Device for taking back empty containers, in particular plastic bottles and metal cans, with a housing which has apparatuses for processing inserted empty containers, an intake chute accessible from the outside that receives empty containers as bulk material and a bottom sloping downward in direction of intake chute. Device is provided that prevents or impedes insertion of excessively large objects into device. Device provides almost unimpeded insertion of empty containers as bulk material into intake chute, and simultaneously prevents that excessively large objects can enter into the device. The bottom of intake chute has a plurality of grooves arranged side by side and running in the intake direction, the grooves flowing into a passage opening leading to the device and whose cross-section is dimensioned in such a manner that empty containers aligned longitudinally in the intake direction can pass unimpeded through the grooves.

8 Claims, 2 Drawing Sheets

(56) References Cited

U.S. PATENT DOCUMENTS

| | | | |
|---|---|---|---|
| 4,505,370 A | | 3/1985 | Swenck |
| 5,221,010 A | * | 6/1993 | Bianco .......................... 209/702 |
| 5,248,102 A | | 9/1993 | Bohn |
| 5,704,558 A | * | 1/1998 | Arrott ............................. 241/47 |
| 5,845,784 A | * | 12/1998 | Gray et al. .................... 209/577 |
| 6,315,159 B1 | * | 11/2001 | Paczkowski ............. 221/312 R |
| 6,547,055 B2 | | 4/2003 | Coyne et al. |
| 6,814,211 B2 | * | 11/2004 | Yunker et al. ............. 193/25 FT |
| 2006/0289276 A1 | | 12/2006 | Hecht et al. |
| 2011/0259714 A1 | | 10/2011 | Handschick et al. |

FOREIGN PATENT DOCUMENTS

| | | |
|---|---|---|
| DE | 10 2008 052 330 | 6/2010 |
| EP | 0 330 714 | 9/1989 |
| EP | 0 591 120 | 4/1994 |

OTHER PUBLICATIONS

English Translation of PCT Notification Concerning Transmittal of International Preliminary Report on Patentability for international application No. PCT/DE2011/001857, dated May 2, 2013 (8 pgs.).

DE Office Action of De application No. 10 2010 048 840.2, dated Sep.30, 2011 (4 pgs.).

International Search Report of PCT/DE2011/001857, dated Apr. 12, 2012 (2 pgs.).

\* cited by examiner

DEVICE FOR TAKING BACK EMPTY CONTAINERS, IN PARTICULAR PLASTIC BOTTLES AND METAL CANS

CROSS REFERENCE TO RELATED APPLICATIONS

This application is a continuation of application no. PCT/DE2011/001857, filed Oct. 18, 2011, which claims the priority of German Application No. 10 2010 048 840.2, filed Oct. 18, 2010, and each of which is incorporated herein by reference.

FIELD OF THE INVENTION

The present invention relates to a device for taking back empty containers, in particular plastic bottles and metal cans according to the preamble of claim 1.

BACKGROUND OF THE INVENTION

Such a device is known from U.S. Pat. No. 4,505,370. This device serves in particular for taking back metal cans. It has a housing that encloses apparatuses that are used in the subsequent handling and if necessary processing of inserted cans. The device also has an intake chute accessible from the outside that takes in empty containers as bulk material and has a bottom that slopes downward in the intake direction. In order to prevent and hinder the insertion of excessively large objects, the intake opening of the intake chute is covered by a grate with a suitable grid. The grate is formed by rods crossing each other. The disadvantage of this solution is that empty containers inserted as bulk material can accumulate on the grill, e.g., by getting stuck, and thereby prevent passage into the intake chute so that a large amount of manual intervention is required to ensure or restore admission into the intake chute.

OBJECTS AND SUMMARY OF THE INVENTION

Object of the present invention is to provide a generic device with which an almost unimpeded insertion of empty containers as bulk material into the intake chute is assured, wherein it is simultaneously prevented that excessively large objects can be inserted into the device.

This object is achieved according to the invention with a device for taking back empty containers that has the features of claim 1.

By way of the inventive grooves provided on the bottom of the intake chute and running in the intake direction, and the slope of the bottom in the intake direction, empty containers on the bottom of the intake chute automatically align themselves to the passage openings so that said containers can pass through unimpeded. Empty containers sliding in also align themselves on the bottom. If necessary, manual assistance is only required to a slight degree for aligning the empty containers.

Additional advantageous embodiments of the invention are disclosed in the dependent claims.

The invention is hereinafter explained in greater detail by way of an embodiment schematically depicted in the related drawings:

DETAILED DESCRIPTION OF THE INVENTION

Figure 1:
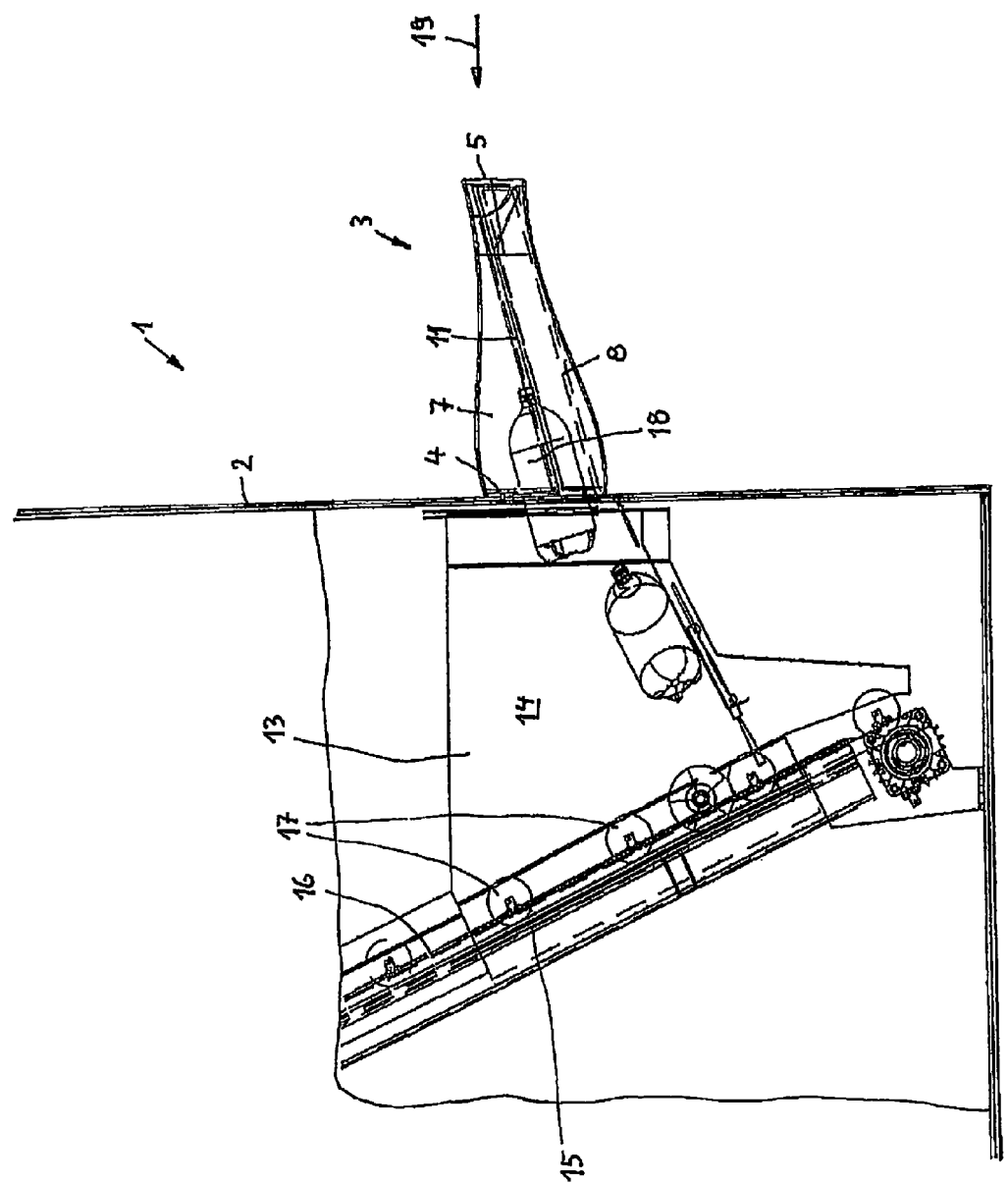
FIG. 1 a housing section of a device for taking back empty containers with an intake chute attached externally on the housing, and FIG. 2 a perspective view only of the intake chute according to FIG. 1.
Figure 2:
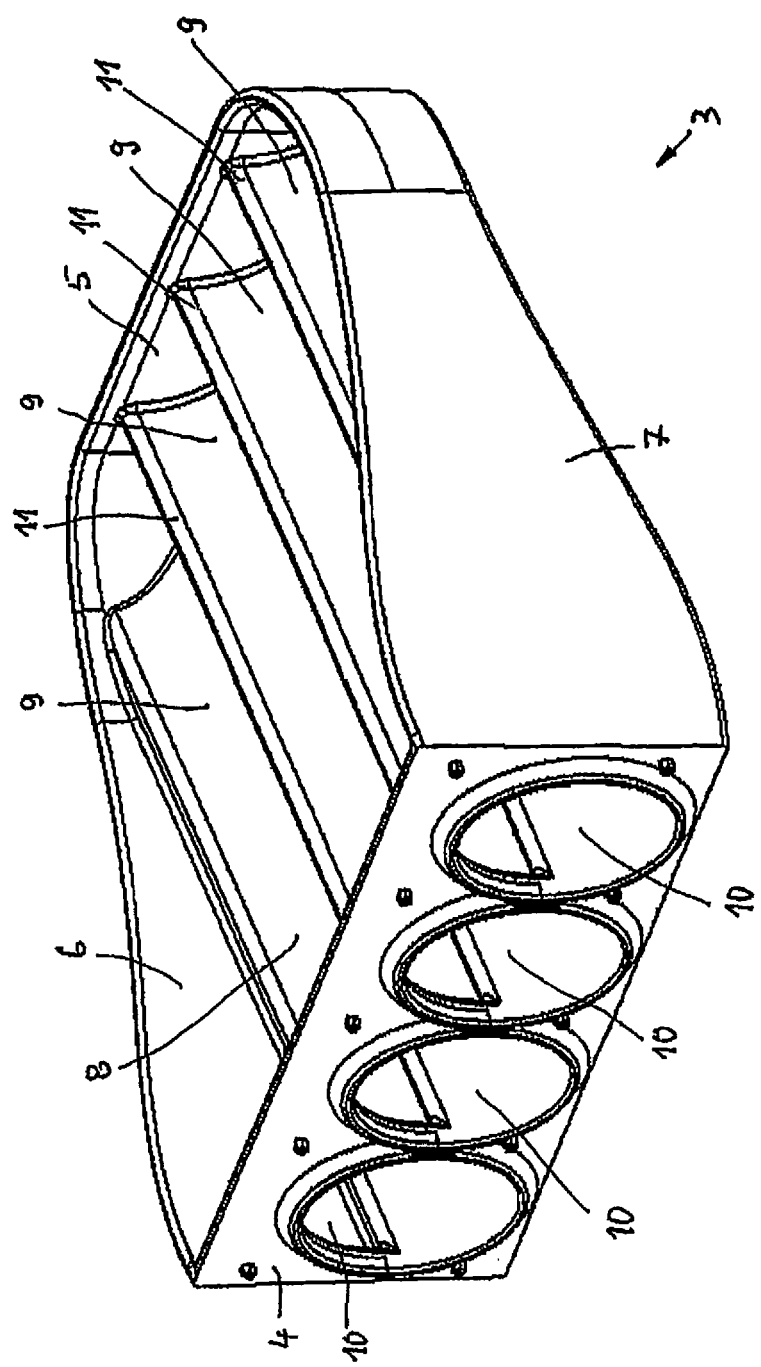

FIG. 1 depicts a section of a housing 1 of a device, otherwise not further pictured, for taking back empty containers 18. An intake chute 3 is attached externally to a perpendicular wall 2 of housing 1. In the region of the attachment location of this intake chute 3, housing 1 is cut away to render visible the internals arranged in housing 1 in this region.

Intake chute 3 consists, in relation to the mounting position, of a back wall 4, a front wall 5, and two side walls 6 and 7, as well as a bottom 8 that is inclined downward by approximately 15° in the intake direction 19 (FIG. 1), in other words towards housing 1.

Bottom 8 is formed of four grooves 9 arranged side by side, which run between front wall 5 and back wall 4 and each have over their entire length a same cross-section, namely of a semi-circle. In back wall 4, grooves 9 each flow into a circular passage opening 10, whose radius corresponds to that of grooves 9. Adjoining grooves 9 directly merge into each other by forming a ridge 11. The cross-section of passage openings 10 and thus also grooves 9 is selected in such a manner that any empty containers 18 with the greatest diameter to be returned can pass through unimpeded.

Intake chute 3 is attached with its back wall 4 to perpendicular wall 2 of housing 1, e.g., by a screw connection. Housing wall 2 has in the region of the attachment location of intake chute 3 a window so that unrestricted access into the interior of housing 1 exists all the way through passage openings 10.

In the interior of housing 1, there is connected to bottom 8 of intake chute 3 also a bottom 12, sloping downward in intake direction 19, of an intake collection space, which has two side walls 14 and is open in intake direction 19. This open side of intake collection space 13 is closed by an inclined conveyor 15, whose upper belt 16 thus forms to a certain extent the back wall of intake collection space 13. Inclined conveyor 15 has roll-shaped carriers 17 that extend over the entire width of intake collection space 13.

Empty containers 18 to be returned, e.g., PET bottles, are inserted to a certain extent as bulk material by dumping, e.g., out of a bag, into intake chute 3. Ridges 11 formed between grooves 9 serve as guide edges and ensure that empty containers 18 initially lying randomly in intake chute 3 are aligned longitudinally in intake direction 19 and thus go into grooves 9 and slide under the force of gravity through passage openings 10 into intake collection space 13. Because of the slope of bottom 12 of intake collection space 13, empty containers 18 roll and/or slide under the force of gravity toward inclined conveyor 15. Carriers 17 of inclined conveyor 15 pass through intake collection space 13, whereupon empty containers 18 lying on carriers 17 are carried away. Carriers 17 have a width, transversally to the conveyor direction of inclined conveyor 15, such that at least two empty containers 18 can lie on carrier 17. Inclined conveyor 15 carries the received empty containers 18 to additional processing stations of the device that are not essential for the present invention and are therefore not depicted.

It may be readily understood that the invention includes a device for taking back empty containers, in particular plastic bottles and metal cans, with a housing which has apparatuses for handling empty containers put into the device, and with an intake chute accessible from the outside, which receives the empty containers as bulk material and has a downward sloping bottom in the intake direction, and an apparatus is provided that prevents or hampers putting excessively large objects into the device, and the bottom 8 of the intake chute 3 has a plurality of grooves 9 arranged next to each other running in the intake direction 19, which each flow into a passage opening leading into the device and whose cross-section is dimensioned in such a manner that lengthwise oriented empty containers can pass unimpeded through the grooves 9 in the intake direction 19.

The adjoining grooves 9 may merge directly into each other by forming a ridge 11.

The intake chute 3 as seen from the intake direction 19 has a front wall 5, a back wall 4, and two side walls 6, 7, wherein the grooves 9 run between the front wall 5 and the back wall 4 and have the same cross-section over their entire length.

The grooves 9 have a semicircular cross-section and each flow into a circular passage opening 10 provided in the rear wall 4 and having the same radius as the grooves 9.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

The invention claimed is:

1. Device for taking back empty containers, comprising:
   a) a housing being provided, the housing including apparatuses for handling empty containers put into the device;
   b) an intake chute being provided, the intake chute having an intake direction and being accessible from the outside, the intake chute receives the empty containers in the intake direction as bulk material and has a downward sloping bottom in the intake direction;
   c) an apparatus being provided which prevents or hampers putting excessively large objects into the housing; and
   d) the downwardly sloping bottom of the intake chute having a plurality of grooves arranged next to each other and running in the intake direction, and each groove flows into a passage opening, the passage opening leading into the housing and having a cross-section dimensioned so that lengthwise oriented empty containers can pass unimpeded through the grooves in the intake direction.

2. Device according to claim 1, wherein:
   a) adjoining ones of the grooves merge directly into each other by forming a ridge.

3. Device according to claim 2, wherein:
   a) the intake chute as seen from the intake direction includes a front wall, a back wall, and two side walls; and
   b) the grooves run between the front wall and the back wall and have the same cross-section over their entire length.

4. Device according to claim 1, wherein:
   a) the intake chute as seen from the intake direction includes a front wall, a back wall, and two side walls; and
   b) the grooves run between the front wall and the back wall and have the same cross-section over their entire length.

5. Device according to claim 4, wherein:
   a) the grooves have a semicircular cross-section and each flow into a circular passage opening provided in the rear wall and having the same radius as the grooves.

6. Device according to claim 3, wherein:
   a) the grooves have a semicircular cross-section and each flow into a circular passage opening provided in the rear wall and having the same radius as the grooves.

7. Device according to claim 1, wherein:
   a) the device for taking back empty containers is configured for handling at least one of plastic bottles and metal cans.

8. Device for taking back empty containers, comprising:
   a) a housing being provided, the housing including apparatuses for handling empty containers put into the device;
   b) an intake chute being provided, the intake chute having an intake direction and being accessible from the outside, the intake chute receives the empty containers in the intake direction as bulk material and has a downward sloping bottom in the intake direction;
   c) an apparatus being provided which prevents or hampers putting excessively large objects into the housing;
   d) the downwardly sloping bottom of the intake chute having a plurality of grooves arranged next to each other and running in the intake direction, and each groove flows into a passage opening, the passage opening leading into the housing and having a cross-section dimensioned so that lengthwise oriented empty containers can pass unimpeded through the grooves in the intake direction;
   e) the intake chute as seen from the intake direction includes a front wall and a back wall;
   f) the grooves run between the front wall and the back wall; and
   g) the grooves have a semicircular cross-section and each flow into a circular passage opening provided in the rear wall and having the same radius as the grooves.

* * * * *